United States Patent [19]

Hirano

[11] Patent Number: 4,583,605
[45] Date of Patent: Apr. 22, 1986

[54] ZERO-POINT CORRECTION DEVICE FOR WEIGHING MACHINE

[75] Inventor: Takashi Hirano, Kobe, Japan

[73] Assignee: Yamato Scale Company, Limited, Japan

[21] Appl. No.: 703,803

[22] Filed: Feb. 21, 1985

[51] Int. Cl.$^4$ ............... G01G 19/52; G01G 13/14
[52] U.S. Cl. .................................. 177/50; 177/165
[58] Field of Search ............................. 177/50, 165

[56] References Cited

U.S. PATENT DOCUMENTS

| | | | |
|---|---|---|---|
| 3,828,869 | 8/1974 | Sellers | 177/50 |
| 3,834,473 | 9/1974 | Girard et al. | 177/50 X |
| 4,316,516 | 2/1982 | Kupper | 177/50 X |
| 4,316,517 | 2/1982 | Jonath | 177/50 X |
| 4,316,518 | 2/1982 | Jonath | 177/50 X |
| 4,524,839 | 6/1985 | Cochran. Jr. et al. | 177/50 X |

*Primary Examiner*—George H. Miller, Jr.
*Attorney, Agent, or Firm*—Senniger, Powers, Leavitt and Roedel

[57] ABSTRACT

A zero-point correction device, which is associated especially with an automatic weighing machine for weighing powdered product repeatedly, for correcting its zero-point deviating from its initial position as the number of weighed batches increases due to accumulation of residual product in the weighing hopper or cradle, without interruption of the machine operation.

8 Claims, 4 Drawing Figures

ZERO-POINT CORRECTION DEVICE FOR WEIGHING MACHINE

This invention relates generally to a zero-point correction device for a weighing machine and, especially, to such a device incorporated in an automatic weighing machine used for cyclic weighing of powdered products.

It is an unavoidable problem of the automatic weighing machine that, when it weighs repeatedly powdered product, residual product remaining in its weighing hopper or cradle is accumulated therein with cyclic weighing operations to deviate its zero-point of measurement from its initial position. A device for automatically compensating for this zero-point shift of the weighing machine is disclosed, for example, in the opened Japanese patent specification No. 52-100259 (filing No. 51-16746). This device is arranged to sense and store the weight of an empty weighing hopper before loading, which is so-called "tare", every cycle of weighing operation, and the measured tare is taken into account in the next measurement of the loaded weighing hopper. With this device, however, it is necessary to interrupt the weighing operation every cycle in order to permit stabilization of the weighing mechanism for obtaining an accurate measurement of the empty weighing hopper, and this results in an undesireable increase in the cycle time of the weighing machine. In order to reduce this problem, the above citation suggests sampling the tare at specific intervals of time, but not every cycle. Though the above problem may be reduced by increasing this time interval, the product remaining in the weighing hopper will increase during successive cycles to further deviate the zero-point.

Accordingly, an object of this invention is to provide a zero-point correction device which can exibit an effect similar to that obtained when the weighing operation is interrupted as described above, without interruption of the weighing operation.

It has been found that a curve indicating variation with time of the amount (weight) of residual product remaining in a specific weighing hopper is fixed if physical features, such as particle size and specific gravity of the powdered product to be weighed, and the weighing conditions, are fixed. This invention utilizes this fact. A folded line (i.e., a series of points connected by lines) prepared by selecting some points on the above curve and connecting these points successively with straight lines can be substituted approximately for that curve when the selection of the points is adequate. The zero-point correction device according to this invention includes a memory for storing the value of tare at each of the above points and the gradient of a straight line connecting each pair of the adjoining points, a counter for counting the number of weighing cycles starting from each point toward the next point, and arithmetic means for calculating from the output count of the counter and the content of the memory a tare value corresponding to the output count.

Now, the invention will be described in more detail below in conjunction with some embodiments with reference to the accompanying drawings.

BRIEF DESCRIPTION OF THE DRAWINGS

Throughout the drawings, same reference numerals are given to corresponding structural components.

Referring to FIG. 1, a curve A starting from the origin O represents tare increase caused by the residual product remaining in the weighing hopper as the number of weighing cycles increases. As described previously, this curve is substantially fixed when the weighing machine, the product to be weighed and the weighing condition are fixed. Accordingly, the curve A can be deemed to be an inherent characteristic curve in a specific case. When points $P_1, P_2, \ldots P_n, P_{n+1}, \ldots$ are selected suitably on the curve A as shown in the drawing, a folded line obtained by connecting these points successively with straight lines (shown as dashed lines) can be an approximation of the curve A. Now, the tare values at these points $P_1, P_2, \ldots P_n, p_{n+1}, \ldots$ are identified respectively as $b_1, b_2, \ldots b_n, b_{n+1}, \ldots$ and the numbers of weighing cycles between 0 and $p_1$; $P_1$ and $P_2, \ldots P_n$ and $P_{n+1}, \ldots$ are identified respectively as $N_0, N_1, \ldots N_n, \ldots$. According to the principle of this invention, the tare value at any point $P_x$ on the curve A between points $P_n$ and $P_{n+1}$ is approximated by the tare value $b_x$ at a point $P_x'$ on the straight line $\overline{P_n P_{n+1}}$ vertically below point $P_x$.

If the number of weighing cycles between $P_n$ and $P_x$ (or $P_x'$) is designated "x", it is readily understood that $b_x$ may be calculated by the following equation:

$$b_x = a_n x + b_n; \tag{1}$$

where $$a_n = (b_{n+1} - b_n)/N_n \tag{2}$$

Accordingly, if the device is provided with counting means for automatically starting to count the number of weighing cycles from each point and producing output count x, and memory means for storing the tare value $b_n$ at each point and the gradient $a_n$ of the straight line connecting each point to the next point, $b_x$ can be calculated by a conventional arithmetic unit.

Figure 2:
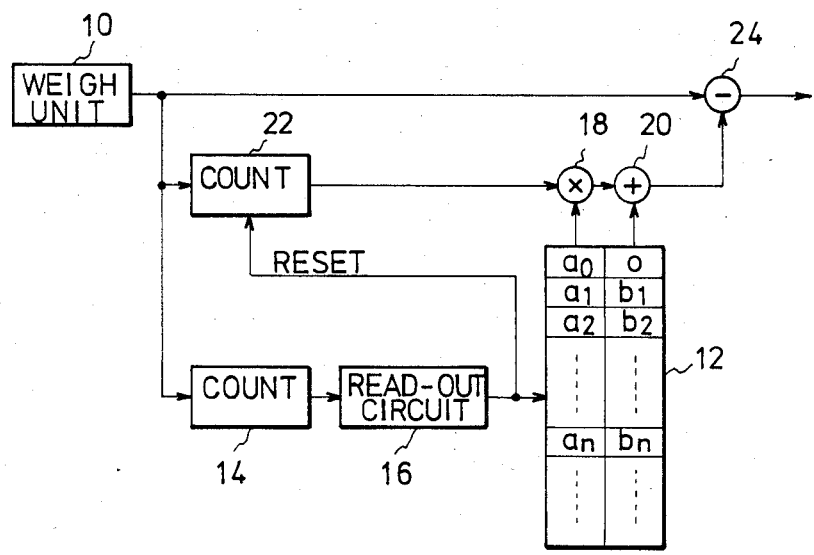
FIGS. 2, 3 and 4 are block diagrams representing various embodiments of this invention, respectively.

Referring to FIG. 2, a weighing unit 10 cyclicly weighs product and provides corresponding weight indicative signals to a subtractor 24. At the same time, counters 14 and 22 sense each delivery of the weight indicative signal from weighing unit 10 to raise its count by one. The output count of counter 14 is supplied to a read-out circuit 16 for accessing a memory 12 which stores the abovementioned gradients $a_0, a_1, a_2, \ldots a_n, \ldots$ and tare values $0, b_1, b_2, \ldots$ at the respective selected points. The circuit 16 is arranged to access the memory 12 to provie to a multiplier 18 and an adder 20, respectively, gradient $a_0$ and tare 0 before count $N_0$ of counter 14, gradient $a_1$ and tare $b_1$ before count $N_1, \ldots$ gradient $a_n$ and tare $b_n$ before count $N_n, \ldots$ and so on. Every time the read-out circuit 16 changes the gradient and tare read out of the memory 12, it also resets counter 22. Therefore, the counter 22 functions to count the weighing cycles x from any point $P_n$. The output count x of counter 22 is supplied to multiplier 18 wherein the output count is multiplied by the corresponding gradient $a_n$ supplied from memory 12, and the resultant product $a_n x$ is supplied to adder 20 in which it is added to tare $b_n$ supplied from memory 12 to produce the approximate tare $b_x$ at point $P_x$ as given by Equation (1) above. This tare value is subtracted from the weight indicative signal from the weighing unit in subtractor 24 which produces a zero-corrected weight indicative signal. The counter 16 is reset when the weighing hopper is cleaned to restore its initial condition.

Figure 3:
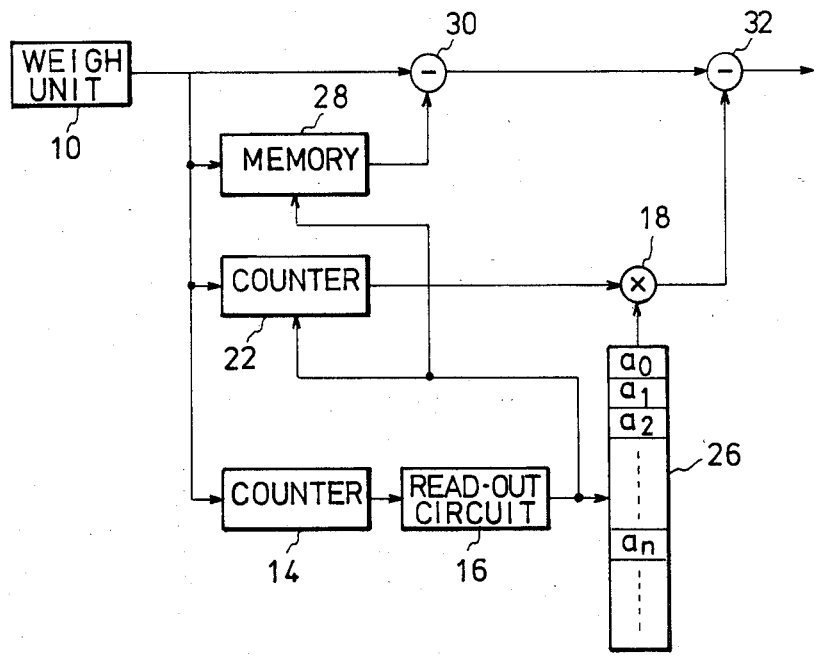

In the embodiment of FIG. 3, circuit components 14, 16, 18 and 22 are similar in structure and operation to the corresponding components of FIG. 2, while memory 26 stores gradients $a_0, a_1, \ldots a_n \ldots$ only, and multiplier 18 again produces the product $a_n x$. In contrast to the first embodiment of FIG. 2, a memory 28 is provided for storing the output weight indicative signal from weighing unit 10 when it has been unloaded and not yet loaded again. The memory 28 is reset at the same time as counter 22, so that it stores a true or measured value of tare corresponding to $b_n$ every time, which is subtracted in a subtractor 30 from the weight indicative signal from weighing unit 10 instead of the referenced value $b_n$. Accordingly, a zero-corrected weight indicative signal obtained by subtracting the output $a_n x$ of multiplier 18 from the output of subtractor 30 by another subtractor 32 should be one which is closer to the true value than the output of subtracter 24 of FIG. 2.

Figure 4:
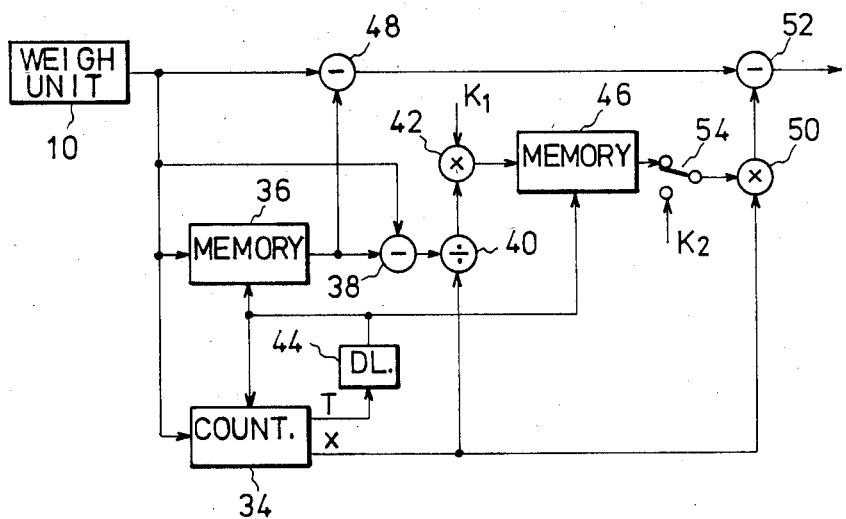

The embodiment of FIG. 4 is arranged to derive both the gradients $a_n$ and the tare weights $b_n$ from measured values. As shown, the output of weighing unit 10 is coupled to counter 34, memory 36 and subtracters 38 and 48. The counter 34 is arranged to count the number of weighing cycles of weighing unit 10 to provide count x in a manner similar to counters 14 and 22 of FIG. 3, and also to produce a control signal T every predetermined count N. While the predetermined count N may be fixed, it is preferred to program the counter 34 to change N in order as $N_0, N_1, N_2, \ldots$ of FIG. 1. The count output x is supplied to one input of divider 40 and multiplier 50 and the control signal output T is applied to a delay unit 44. The delay unit 44 is arranged to delay control signal T until weighing unit 10 has been unloaded in its N-th weighing cycle (but not yet reloaded). The delayed control signal T is applied to a control terminal of counter 34 to clear it, and also to control terminals of memories 36 and 46 to enable them. The output of memory 36 is supplied to second inputs of subtractors 38 and 48 whose outputs are supplied respectively to divider 40 and further subtractor 52. The output of divider 40 is supplied to a multiplier 42 in which it is multiplied by a separately established constant $K_1$ which is supplied from a suitable register (not shown). The output of multiplier 42 is supplied to memory 46 whose output is coupled through a single-pole double-throw switch 54 to a second input of multiplier 50 whose output is supplied to a second input of multiplier subtracter 52.

Figure 1:
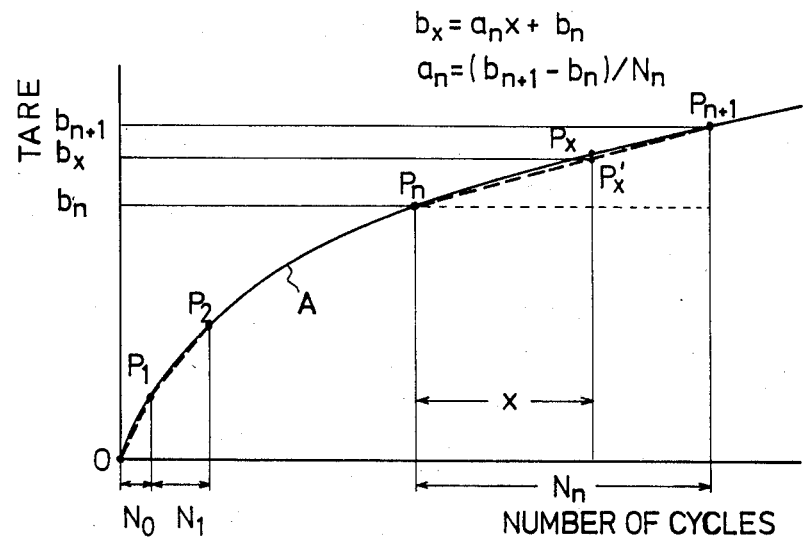
FIG. 1 is a diagram explaining the principle of this invention.

When operation starts at the origin O of FIG. 1, switch 54 is turned to the position opposite that shown in order to supply another constant $K_2$ to one terminal of multiplier 50 from a suitable source (not shown). The value of constant $K_2$ is the gradient of straight line $\overline{OP_1}$ and it is preferably selected to be equal to $a_0$ of the above embodiments. Since memory 36 is not yet enabled and its content is equal to zero, the output weight $W_x$ of weighing unit 10 corresponding to count x of counter 34 is transferred as it is to subtracter 52. On the other hand, the output x of counter 34 is multiplied by constant $K_2$ in multiplier 50 and the resultant product $K_2 x$ is supplied to the other input of subtracter 52. Thus, subtracter 52 will produce a zero-corrected weight signal $W_x - K_2 x$ or approximately $W_x - a_0 x$ until point $P_1$ of FIG. 1 is reached.

When the count of counter 34 reaches $N_0$, the tare (weight of residue) $b_1$ corresponding to point $P_1$ is first applied to subtractor 38 and then transferred as it is to divider 40 since the zero content of memory 36 is unchanged. Then, the divider 40 has received already count $N_0$ from counter 34 and, therefore, it supplies its output $b_1/N_0$, namely, gradient $a_0$ of straight line $\overline{OP_1}$, to multiplier 42. As described above, multiplier 42 multiplies this input by constant $K_1$ and supplies the resultant product $K_1 a_0$ to memory 46. $K_1$ is a predetermined correction factor for substituting gradient $a_0$ for $a_1$ and, generally, selected so that $a_{n+1}$ is nearly equal to $K_1 a_n$.

Then, counter 34 is cleared and memories 36 and 46 are enabled by control signal T from delay unit 44 and, at the same time, switch 54 returns to the position shown. Accordingly, memories 36 and 46 store their inputs $b_1$ and $K_1 a_0$, respectively. Consequently, if the weight output $W_x$ of weighing unit 10 corresponding to count x of counter 34 after point $P_1$ is $W_x$, the output of subtracter 52 will be $W_x - (a_1 x + b_1)$ which is nearly equal to $W_x - (K_1 a_0 x + b_1)$. Generally speaking, the output of subtracter 52 between points $P_n$ and $P_{n+1}$ of FIG. 1 is nearly equal to $W_x - (a_n x + b_n)$, because the contents of memories 36 and 46 are updated every delivery of predetermined count from counter 34. This amount of correction, $a_n x + b_n$ is identical to that in the first and second embodiments.

In the embodiments of FIGS. 3 and 4, it is necessary to sample the weight signal from an empty weighing unit every predetermined count and, at that time, the weighing unit must be in its stable state. However, if the weighing unit is loaded after reaching its stable state every cycle, there is no difference from the prior art system as cited in the preface, in view of time-consuming feature. In this embodiment, therefore, it is preferred to provide means for delaying the loading operation of the weighing unit only at the time of sampling the tare value.

While, in the above embodiments, the numerical values $a_n$ and $b_n$ were stored in the memory and the tare was calculated from them and count x, it is obvious that the numerical values $b_n$, $b_{n+1}$ and $N_n$ may be stored to calculate the tare from them and count x since $a_n$ is given by Equation (2) above.

I claim:

1. A zero-point correction device for a weighing machine in which residual product is unavoidably left behind after unloading of said machine and the tare weight of the machine increases due to said residual product during successive weighing cycles along a known curve; said device comprising memory means for storing the tare weight $b_n$ ($n = 1, 2, \ldots$) at each of a plurality of points $P_n$ ($n = 1, 2, \ldots$) sampled on said curve and the gradient $a_n$ of a straight line connecting each point $P_n$ to the next point $P_{n+1}$ on said curve, means for counting the number of weighing cycles starting from each point to produce a count output x, arithmetic means for calculating a value representative of the tare weight $b_x$ at a point on said curve between two points $P_n$ and $P_{n+1}$ from the above numerical values $a_n$, $b_n$ and x in accordance with an equation, $b_x = a_n x + b_n$, and means for subtracting the output of said arithmetic means from a weight representative of the output weight of said weighing machine.

2. The device according to claim 1, wherein said memory means is adapted to store, instead of said value $a_n$, the number of weighing cycles $N_n$ from each point $P_n$ to said next point $P_{n+1}$ on said curve, and the tare weight $b_{n+1}$ at said next point $P_{n+1}$, said arithmetic means being adapted for calculating said value $a_n$ in accordance with an equation, $$a_n = (b_{n+1} - b_n)/N_n.$$

3. The device according to claim 1, wherein said device further comprises means for measuring the tare weight $b_n$ at each point on said curve, and said memory means is adapted to store said measured tare weight instead of said value $a_n$.

4. The device according to claim 3, wherein said device further comprises means for calculating the gradients of straight lines connecting the adjoining points on said curve from the measured tare weights at said points and the corresponding numbers of weighing cycles between said adjoining points, and said memory means is adapted to store the calculated value of gradient for the preceding weighing cycle.

5. A zero-point correction device for automatically compensating for an increase in the tare weight of an automatic weighing machine where the amount of residual product remaining in the machine after unloading of the machine increases during sucessive weighing cycles of the machine along a predetermined curve, said device comprising:

means for storing information representative of the tare weight $b_n$ (n=1, 2, . . . ) at each of a plurality of points $P_n$ (n=1, 2, . . . ) along said curve, and information relating to the gradient $a_n$ of a straight line connecting each point $P_n$ to the next point $P_{n+1}$ on said curve;

means for counting the number of weighing cycles starting from each point to produce a count output X;

arithmetic means for calculating a value representative of the tare weight $b_x$ at a point on said curve between two points $P_n$ and $P_{n+1}$ in accordance with the following equation:

$$b_x = a_n x + b_n;\ \text{and}$$

means for subtracting said value representative of the tare weight $b_x$ from a weight representative of the output weight of said weighing machine.

6. A zero-point correction device as set forth in claim 5 wherein said information relating to gradient $a_n$ includes the number of weighing cycles $N_n$ from each point $P_n$ to said next point $P_{n+1}$ on said curve and the tare weight $b_{n+1}$ at said next point $P_{n+1}$, said arithmetic means being operable to calculate said gradient $a_n$ in accordance with the following equation: $a_n = (b_{n+1} - b_n)/N_n$.

7. A zero-point correction device as set forth in claim 5, further comprising means for measuring the actual tare weight $b_n$ of the machine at times corresponding to each point $P_n$ on said curve.

8. A zero-point correction device as set forth in claim 7 wherein said arithmetic means is operable to calculate the gradients of straight lines connecting adjacent points on said curve from information comprising the measured tare weights at said adjacent points and the corresponding numbers of weighing cycles taking place between said adjacent points, said memory means being operable to store a calculated value of gradient for the preceding weighing cycle.

* * * * *